(12) United States Patent
Terry

(10) Patent No.: US 6,339,613 B2  
(45) Date of Patent: Jan. 15, 2002

(54) REDUCING CROSSTALK BETWEEN COMMUNICATIONS SYSTEMS

(75) Inventor: John Brian Terry, Cumming, GA (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/259,681

(22) Filed: Mar. 1, 1999

Related U.S. Application Data

(63) Continuation of application No. 08/691,486, filed on Aug. 2, 1996, now Pat. No. 6,055,297.

(51) Int. Cl.[7] .......................... H04B 17/00; H04B 3/46; H04Q 1/20
(52) U.S. Cl. ........................ 375/227; 370/201
(58) Field of Search .................. 375/227, 222, 375/223, 225; 379/93.28, 93.31, 93.32, 93.36; 370/201; 324/628

(56) References Cited

U.S. PATENT DOCUMENTS

| | | | | |
|---|---|---|---|---|
| 2,111,023 A | * | 3/1938 | Dixon | 370/201 |
| 4,113,987 A | | 9/1978 | Samuelsson | 370/201 |
| 4,309,105 A | | 1/1982 | Lebduska | |
| 4,450,555 A | | 5/1984 | Pays | 370/31 |
| 4,953,206 A | | 8/1990 | Friesen et al. | 379/417 |
| 5,086,423 A | * | 2/1992 | Streit et al. | 370/201 |
| 5,341,419 A | | 8/1994 | Ferry | 379/417 |
| 5,375,123 A | | 12/1994 | Andersson et al. | |
| 5,450,392 A | | 9/1995 | Waltrich | 370/201 |
| 5,511,119 A | | 4/1996 | Lechleider | 379/414 |
| 5,532,603 A | * | 7/1996 | Bottman | 324/628 |
| 5,570,029 A | * | 10/1996 | Bottman et al. | 324/628 |
| 5,887,032 A | * | 3/1999 | Cioffi | 375/257 |

FOREIGN PATENT DOCUMENTS

| | | |
|---|---|---|
| EP | 0 049 670 | 4/1982 |
| WO | 94/18781 | 8/1994 |

OTHER PUBLICATIONS

Patent Abstracts of Japan, "Hierarchical Modulation System and Transmitter–Receiver," Pub. No. 07321765, Dec. 8, 1995.

M. Carbonelli et al., "Evaluation of Near–End Crosstalk Noise Affecting ADSL Systems," 1994, IEEE, vol. 2, pp. 630–634.

\* cited by examiner

Primary Examiner—Chi Pham  
Assistant Examiner—Phuong Phu  
(74) Attorney, Agent, or Firm—Foley & Lardner

(57) ABSTRACT

Modems using a telephone line for high speed communications between them are arranged to monitor crosstalk from other existing communications systems with which they may mutually interfere, and adjust the power spectral densities (PSDs) of their transmitted signals to reduce overlap between the PSDs of the different systems, thereby reducing near end crosstalk. Communications can thereby be optimized for whatever crosstalk conditions may exist. The modems can have a master-slave relationship for communicating buffered frames in a half-duplex manner using a collision avoidance protocol for computer network access. Analysis of monitored crosstalk PSD information can be performed by each modem, by the master modem, or by a separate computer on the network. A digital signal processor used in each modem for receiving signals can be configured to be used at other times for the monitoring of crosstalk.

20 Claims, 3 Drawing Sheets

REDUCING CROSSTALK BETWEEN COMMUNICATIONS SYSTEMS

This is a continuation of U.S. patent application Ser. No. 08/691,486 filed Aug. 2, 1996 in the name of John B. Terry, entitled "Reducing Crosstalk Between Communications Systems", now issued U.S. Pat. No. 6,055,297, the entire disclosure of which is hereby incorporated herein by reference.

This invention relates to reducing crosstalk between communications systems. The invention is particularly, but not exclusively, applicable to reducing NEXT (near end crosstalk) between twisted pairs of wires in telephone cables used historically for providing telephone service to subscribers and now being used increasingly to provide additional communications services, for example for data communications and computer network connections.

REFERENCE TO RELATED APPLICATION

Reference is directed to U.S. patent application Ser. No. 08/640,705 filed May 1, 1996 in the names of J. B. Terry et al., entitled "Information Network Access Apparatus And Methods For Communicating Information Packets Via Telephone Lines", the entire disclosure of which is hereby incorporated herein by reference. This application, referred to below as the related application, describes and claims methods and apparatus which can be used in particular to facilitate remote access via conventional twisted pair telephone lines to computer networks such as the global computer information network which is generally known as the Internet and is referred to herein as the Network. The present invention is not limited in any way to the arrangements of this related application, but can be applied in a particularly convenient manner to such arrangements as is described later below.

BACKGROUND OF THE INVENTION

Twisted pair public telephone lines are increasingly being used to carry relatively high-speed signals instead of, or in addition to, telephone signals. Examples of such signals are ADSL (asymmetric digital subscriber line), HDSL (High Density Subscriber Line, T1 (1.544 Mb/s), and ISDN signals. There is a growing demand for increasing use of telephone lines for high speed remote access to computer networks, and there have been various proposals to address this demand, including using DOV (data over voice) systems to communicate signals via telephone lines at frequencies above the voice-band.

The provision in the public telephone network of varied services using such diverse communications systems imposes a requirement that different and similar systems not interfere with one another. A predominant limiting effect in this respect is NEXT (near end crosstalk) between wire pairs within multiple-pair cable binder groups or between wire pairs within adjacent binder groups.

Allocations of wire pairs within telephone cables in accordance with service requests have typically resulted in a random distribution of pair utilization with few precise records of actual configurations. In addition, due to the nature of pair twisting in cables, and where cable branching and splicing occurs, a wire pair can be in close proximity to different other pairs over different parts of its length. At a telephone C.O. (central office), pairs in close proximity may be carrying diverse types of service using various modulation schemes, with considerable differences in signal levels (and receiver sensitivities) especially for pairs of considerably different lengths.

Statistical data has been developed that can be used to estimate crosstalk between services using different pairs of multi-pair telephone cables, for example in terms of BER (bit error rate) based on power spectral density (PSD, for example measured in milliwatts per Hertz expressed in decibels, or dBm/Hz) overlap between the services. However, this statistical data is of limited use in practice in the provision of a new service using equipment connected to a specific wire pair, in view of factors such as those discussed in the preceding paragraph.

It is therefore a significant concern of telephone companies that the signals and operation of existing systems may be adversely affected, especially as a result of NEXT, by the deployment of new equipment, particularly digital signal transmission equipment. This concern is increased in accordance with the extent to which such equipment is likely to be deployed, and hence particularly applies to equipment that may be used in very large numbers for remote access to computer networks. New equipment can be designed in a manner largely to avoid interference with other systems in accordance with the statistical data, but this imposes undesirable constraints on signal spectra and signal levels, limiting its usefulness in an unacceptable manner to accommodate a relatively small proportion of situations for which such constraints may be necessary.

An object of this invention is to provide a method that can permit new communications systems to be added to existing communications paths in a manner that is generally compatible with existing systems where these exist, and that can make optimum use of communications capacity.

SUMMARY OF THE INVENTION

This invention provides a method of determining a power spectral density (PSD) for supplying signals from a signal transmitter to a communications path, comprising the steps of: determining a PSD on the communications path, due to other communications, in the absence of signals supplied from the signal transmitter to the communications path; supplying signals from the signal transmitter to the communications path; and adjusting at least one parameter of the signals supplied from the signal transmitter to the communications path in dependence upon the determined PSD to reduce overlap between the PSD of the signals supplied from the signal transmitter to the communications path and the determined PSD.

Thus a new communications system, operating in accordance with this method, determines PSD on the communications path, primarily due to NEXT from other existing communications systems using adjacent communications paths, and then adjusts its own PSD to reduce, and desirably to minimize, overlap between the PSDs. On the basis that crosstalk between different communications paths is equal for opposite directions, the method consequently reduces, and desirably minimizes, interference from the new communications system with any existing communications systems that may be affected by the new system. Thus each new communications system that is deployed, for example in a public telephone network where the communications paths comprise twisted pair telephone lines, can be operated in a manner that is adaptively adjusted to minimize interference with existing systems in its own particular communications path environment. The adaptive adjustment can be performed only once on deployment of the new system, or much more desirably in an ongoing manner.

The step of determining a PSD on the communications path can comprise monitoring a PSD on the communications path, while signals are not supplied from the signal transmitter to the communications path, to produce the determined PSD. As an alternative to not supplying signals from the signal transmitter to the communications path during the monitoring, the PSD of signals supplied from the signal transmitter to the communications path could be subtracted from the monitored PSD representing the PSD on the communications path, due to other communications, in the absence of signals supplied from the signal transmitter to the communications path.

Thus the determined PSD can be constituted by the monitored PSD. Such a determination can be valid where the existing communications systems are symmetric systems, for which the PSD of signals having opposite directions of transmission can be substantially the same, but can be inaccurate for asymmetric systems for which the PSD of signals having opposite directions of transmission can be substantially different. For example, in an ADSL system the spectral utilization, and hence the PSDs, of signals in the two opposite directions of transmission are substantially different.

In view of this, preferably the step of determining a PSD on the communications path comprises the steps of: storing PSD templates for communications systems; monitoring a PSD on the communications path, due to other communications, in the absence of signals supplied from the signal transmitter to the communications path; comparing the monitored PSD on the communications path with the templates to identify a communications system corresponding to the monitored PSD; and producing the determined PSD in dependence upon the identified communications system. This enables the PSD of signals supplied from the signal transmitter to the communications path to be adjusted to reduce overlap with the PSD of signals of an existing system transmitted in the opposite direction of an adjacent communications path, this being appropriate because of the predominance of NEXT.

The at least one parameter that is adjusted to reduce PSD overlap can comprise the power (i.e. level), frequency band, and/or modulation scheme of signals supplied from the signal transmitter to the communications path. Desirably, all of these parameters are adjusted collectively to achieve minimal interference with existing communications systems consistent with optimal performance of the new communications system.

BRIEF DESCRIPTION OF THE DRAWINGS

The invention will be further understood from the following description with reference to the accompanying drawings, in which.

DETAILED DESCRIPTION

Figure 1:
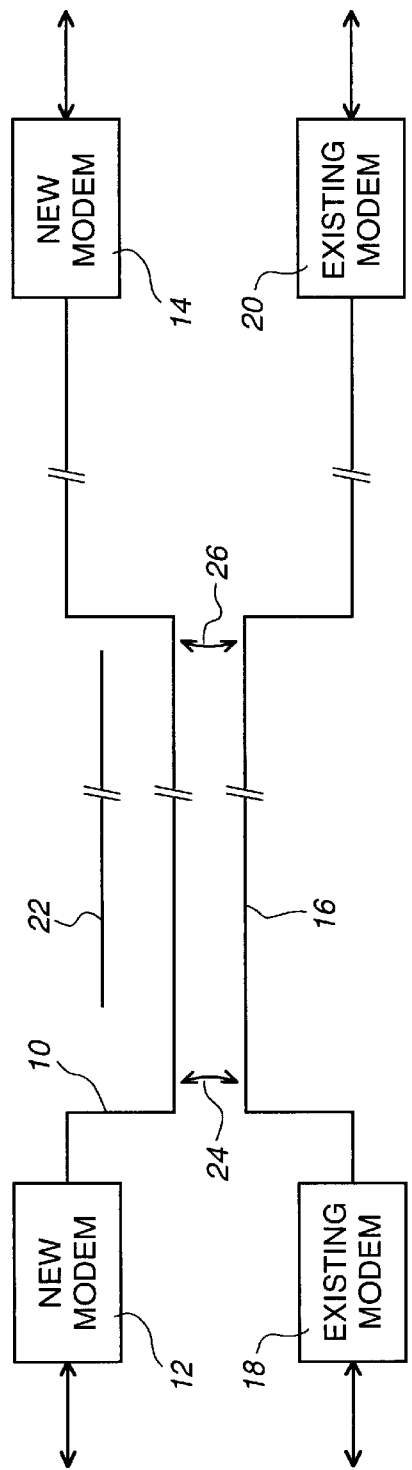
FIG. 1 illustrates a communications arrangement using twisted pair telephone lines for communicating high-speed signals, to which the invention is particularly applicable.

Referring to FIG. 1, a line 10 represents a telephone line which it is desired to use to provide communications between a modem 12, connected to the line 10 at a telephone C.O. end thereof, and a complementary modem 14 connected to the line 10 at a subscriber end thereof. As is well known, diplexing filters (not shown) can be provided at the ends of the line 10 to permit the line to carry telephone communications simultaneously with communications at higher frequencies between the modems 12 and 14. For simplicity, associated telephone equipment is not shown in FIG. 1.

The telephone line 10 physically comprises a twisted wire pair which is typically in close proximity along at least part of its length with other such twisted pairs in one or more multi-pair cables. These other pairs may carry arbitrary communications signals, including telephone and high-speed data signals, which as a result of crosstalk may interfere with, and may be interfered with by, signals at similar frequencies on the line 10. As discussed in the background of the invention, the environment of the telephone lines and associated records make it impractical to determine what communications equipment may be connected to which twisted pairs over what parts of their lengths, so that the nature and extent of any such interference can not generally be predetermined. Because the deployment of high-speed communications systems is relatively small compared to the total deployment of telephone lines, there frequently may be no significant interference. In some cases, however, there is potential for interference with an existing communications service.

For example, FIG. 1 illustrates that over part of its length the line 10 may be in close proximity to another telephone line 16 which is used for high-speed communications between a modem 18 at the C.O. end of the line 16 and a modem 20 at a subscriber end of this line. In the description below it is assumed, for example and in order to describe principles of the invention fully, that the existing modems 18 and 20 provide for ADSL communications via the line 16, but the invention is applicable regardless of the nature of the communications signals on the lines. A line 22 represents other telephone lines which may or may not carry potentially interfering signals which would also be susceptible to interference.

Because of the close proximity of the lines 10 and 16, crosstalk undesirably can occur between these lines; i.e. signals on one line are coupled to some extent to the other line, the extent depending upon numerous factors such as the physical characteristics of the cable including these lines, and the levels and frequencies (i.e. the power spectral density) of the signals. Crosstalk is a particular concern for high-speed transmission, i.e. where both lines carry signals at relatively high frequencies using similar or overlapping frequency bands. For the majority of telephone lines represented by the line 22, the addition of the modems 12 and 14 for high-speed communications via the line 10 is not a significant problem as far as crosstalk is concerned, because the majority of telephone lines do not also carry high frequency signals for high-speed transmission. For a relatively small number of telephone lines such as the line 16, the addition of the modems 12 and 14 for high-speed communications via the line 10 presents a potential problem as far as crosstalk is concerned, because crosstalk from the line 10 to the line 16 can impair the signal transmission on the line 16, and vice versa.

The main concern in this respect is NEXT, represented schematically in FIG. 1 by double-headed arrows 24 and 26 at the C.O. and subscriber ends, respectively, of the adjacent parts of the lines 10 and 16. This can be seen to be the case from the fact that a signal from the modem 12 coupled by crosstalk from the nearest end of the line 10 to the line 16 and back to the modem 18 is attenuated by the lines 10 and 16 to a relatively small extent, whereas a signal transmitted from the modem 14 coupled by crosstalk from the line 10 to the line 16 and received by the modem 18 (FEXT or far end crosstalk) is subject to significant attenuation by the length of the lines 10 and 16. Conversely, a signal from the modem 14 coupled by crosstalk from the nearest end of the line 10 to the line 16 and back to the modem 20 is attenuated by the lines 10 and 16 to a relatively small extent, whereas a signal transmitted from the modem 12 coupled by crosstalk from the line 10 to the line 16 and received by the modem 20 is subject to significant attenuation by the length of the lines 10 and 16. Reciprocally, signals on the line 16 are also coupled by crosstalk to the line 10, and again NEXT is the most significant factor in view of the relative attenuation of signals by the lengths of the lines over which they are communicated.

For explaining principles in accordance with which embodiments of this invention operate, it is assumed for example that signals from the ADSL modem 18 to the ADSL modem 20 (referred to as the downstream direction) occupy a broad frequency band in a range of about 100 kHz to about 1 MHz, and that signals from the ADSL modem 20 to the ADSL modem 18 (referred to as the upstream direction) occupy a narrower frequency band in a range of about 50 to about 150 kHz. These figures are given only for illustrative purposes and for convenience in explaining the invention.

A desirable result that the invention facilitates achieving is to permit the addition and operation of the new modems 12 and 14 in a manner that reduces crosstalk between the line 10 and other lines 16 and 22 to the extent that this is necessary to avoid interfering undesirably with any communications, such as the ADSL communications between the modems 18 and 20, that may (but frequently will not) exist on such other lines, while permitting the new modems 12 and 14 to communicate via the line 10 in an optimum manner, e.g. with the highest allowable signal levels and the greatest allowable frequency bandwidths.

To this end, a sequence of steps described below is carried out initially and/or in an ongoing manner (e.g. periodically, irregularly as desired, or dependent upon parameters such as traffic conditions). These steps include measurements or monitoring of the line 10 to which the modems 12 and 14 are connected. As described initially below, it is convenient for the modems themselves not to transmit signals to the line 10 during measurement or monitoring periods, but there can be alternatives to this, and to other aspects of the immediately following description, that are discussed later below.

The new modems 12 and 14 first suspend transmission of signals to the line 10 during a monitoring period that can be relatively brief, e.g. 50 ms, or more protracted as desired or necessary. During one or more such monitoring periods, in each of the modems 12 and 14, separately or simultaneously, the modem receiver performs a spectral analysis of any signals that may be received via the line 10. This spectral analysis is conveniently performed by controlling the bandwidth and center frequency of a receive bandpass digital filter in the modem to receive signals within a narrow bandwidth that is progressively changed over a desired spectrum, for example 20 kHz to 1 MHz, while monitoring the power level of any signal that is received. It can be appreciated that any such signal will be predominantly a result of NEXT from signals on adjacent lines 16 and 22, and that the power spectrum that is constituted by this monitoring will represent the extent of the crosstalk and will be characteristic of the type of communications signals contributing to this crosstalk.

Thus each of the modems 12 and 14 can determine not only the extent of crosstalk between the line 10 and any other lines 16 and 22, but also, from a comparison of the monitored power spectrum with stored templates of power spectra for various systems, suitably modified to take into account the known NEXT frequency characteristics of the twisted pair cable, the type of communications system predominantly contributing to such crosstalk. Each of the modems 12 and 14 then adjusts the power spectral density (PSD) for signals that it will transmit to the line 10 to minimize overlap with the PSD of signals for the opposite direction of transmission for any determined communications system contributing to the monitored NEXT. On the basis that crosstalk between the line 10 and each other line is reciprocal, this also minimizes NEXT from signals on the line 10 between the modems 12 and 14 to any such determined communications system, whereby the different systems can both operate with minimal interference between them. The modems 12 and 14 then resume (or start) transmission of signals to the line 10 in accordance with the adjusted PSD.

More specifically, in this example the modem 12 will receive and monitor a power spectrum having components in the broad frequency range of 100 kHz to 1 MHz of the downstream ADSL signals on the line 16, and will determine from this that it must adjust the PSD of its transmitted signals to avoid NEXT with upstream signals of an ADSL system which are received by the existing modem 18. It therefore adjusts the spectrum of its transmitted signals to avoid the 50 to 150 kHz range of upstream ADSL signals, for example controlling a digital transmit filter to provide a pass band from 150 kHz to 1 MHz, and transmits its signals at an appropriate level within this frequency band, where even at a relatively high power level they do not interfere with the ADSL communications on the line 16. Conversely, the modem 14 will receive and monitor a power spectrum having components in the narrower frequency range of 50 to 150 kHz of the upstream ADSL signals on the line 16, and will determine from this that it must adjust the PSD of its transmitted signals to avoid NEXT with downstream signals of an ADSL system which are received by the existing modem 20. It therefore adjusts the spectrum of its transmitted signals to avoid the 100 kHz to 1 MHz range of downstream ADSL signals, for example controlling a digital transmit filter to provide a pass band from 50 to 100 kHz, and transmits its signals at an appropriate level within this frequency band, where they also do not interfere with the ADSL communications on the line 16.

Where the monitored power spectrum relates to a symmetrical communications system, for example ISDN signals, rather than an asymmetrical system such as ADSL as described by way of example above, the adjusted PSDs for signals to be transmitted by the modems 12 and 14 can be the same rather than different as described above.

Although as described above transmission of signals by the modems 12 and 14 is suspended during each monitoring period, this need not necessarily be the case. For example, for the monitoring by the modem 12, it is not essential for transmission of signals on the line 10 from the modem 14 to be suspended, because the PSD of such signals at the modem 12 can be known and compensated for in the monitoring by the modem 12. However, this would require the modem 12 to have separate facilities for receiving the signals from the modem 14 and for monitoring purposes, in contrast to using the same receive filter at different times for receiving signals and for spectral analysis as described above, which is much more preferable. Also, the modem 12 can conceivably be arranged to monitor for NEXT at the same time that it is itself supplying signals to the line 10, these signals having a known PSD which can be subtracted in the monitoring and spectral analysis process. However, this may be relatively difficult to achieve in practice, especially because the monitored NEXT has a much lower power than the signals supplied to the line 10 by the modem 12. Accordingly, it is more desirable in practice to suspend the transmission of signals by the modem doing the monitoring of NEXT, and preferably by both modems, during the monitoring.

In addition, although as described above the modems 12 and 14 operate relatively independently of one another and each performs the necessary spectral analysis, this need not be the case. More particularly, and for example as described in greater detail below, the modem 14 may be subordinate to the modem 12 in a master-slave relationship, the modem 14 performing monitoring and adjusting the PSD of its transmitted signals in response to command messages from the modem 12, the spectral analysis process being performed by the modem 12. As a further alternative, as described further below, the spectral analysis for a plurality of lines 10 and associated C.O. modems 12 (which may be multiplexed for different lines 10) and customer modems 14 may be performed centrally by a separate computer unit which communicates messages with the modems in a time multiplexed manner.

These alternatives are particularly advantageous in a network access arrangement in accordance with the related application referred to above. In such an arrangement, access to a CSMA/CD (Carrier Sense Multiple Access with Collision Detection) network, such as the Network using Ethernet frames, is provided via a telephone line by providing a master modem at the head end and a slave modem at the subscriber end of the line. The master modem provides a CSMA/CD interface to the Network and controls half duplex communications with the slave modem via the line to avoid collisions of Ethernet frames on the line. The Ethernet frames are enveloped in frames on the line with error checking information; control information between the modems is contained in the same and/or in separate frames. The modulation method and signal bandwidth can be varied depending on errors to provide optimum communications capacity via any particular line, and a ratio of upstream to downstream frames can be varied depending on buffer fills at the modems. The master modem can be multiplexed for multiple lines. The modulated signal frequencies are above telephone signal frequencies so that each line can be frequency diplexed for simultaneous telephone communications.

Figure 2:
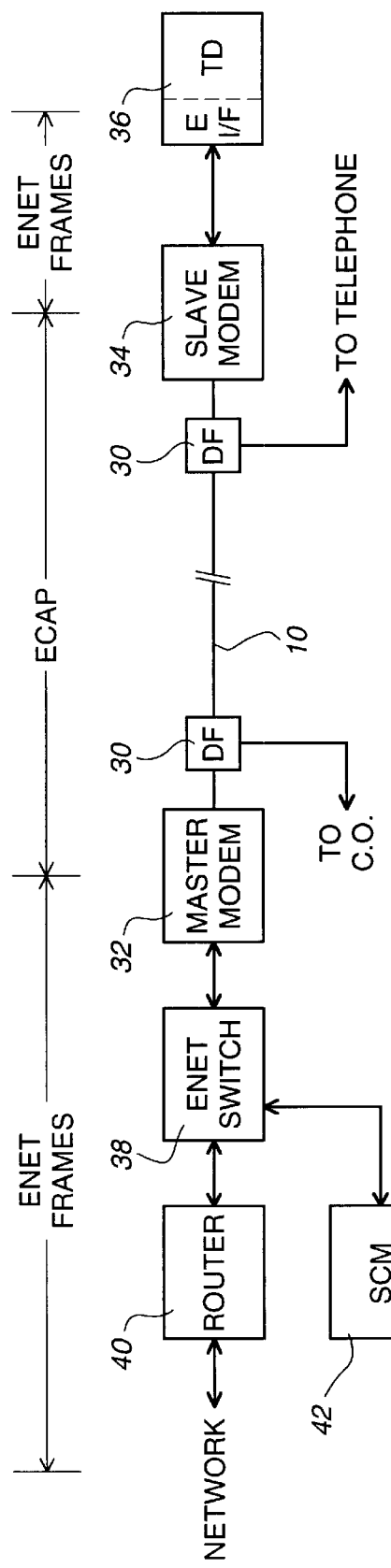
FIG. 2 illustrates a communications arrangement in accordance with an embodiment of this invention.

FIG. 2 illustrates such an arrangement for one subscriber. In FIG. 2, the modem 12 at the C.O. end of the line 10 in FIG. 1 is constituted by a master modem 32, and the modem 14 at the customer end of the line 10 in FIG. 1 is constituted by a slave modem 34. The master and slave modems 32 and 34 are coupled to the telephone line 10 via diplexing filters (DF) 30, which serve in known manner to separate low frequency telephone signals, communicated between the telephone C.O. (not shown) and a customer telephone (not shown) at the respective ends of the line 10, from higher frequency signals between the modems 32 and 34, these signals being frequency-multiplexed on the line 10.

Each of the modems 32 and 34 includes an Ethernet interface of known form. At the customer end of the line 10, Ethernet (ENET) frames communicated via the slave modem 34 are coupled to an Ethernet interface (E I/F) of known form in a terminal device (TD) 36 which may for example be constituted by a personal computer. Thus Ethernet frames are communicated between the slave modem 34 and the terminal device 36 in known manner, for example using twisted pair wiring and the 10BASE-T CSMA/CD standard; this communication can be expanded in known manner into a more extensive LAN (local area network). At the C.O. end of the line, Ethernet frames communicated via the master modem 32 are coupled via an Ethernet hub or switch 38 and a router 40 to the Network. The Ethernet hub or switch 38 and router 40 are both of known form. In addition, a spectral compatibility manager (SCM) 42, for example constituted by a computer, is also connected to the Ethernet switch 38 as shown or elsewhere in the Network. The function of the SCM 42 is described later below.

As shown at the top of FIG. 2, Ethernet frames are thus communicated on the customer side of the slave modem 34 and on the Network side of the master modem 32. Between the modems 32 and 34, Ethernet frames are communicated using a point-to-point protocol which uses collision avoidance and for convenience is referred to as ECAP (Ethernet Collision Avoidance Protocol). Reference is directed to the related application for a detailed description of this, but it is outlined below.

The master and slave modems buffer Ethernet frames to be communicated downstream (from the master modem 32 to the slave modem 34) and upstream (from the slave modem 34 to the master modem 32). The ECAP communications of the buffered Ethernet frames involves half-duplex transmission in which the master modem 32 has priority and control over the slave modem 34. Thus the master modem 32 determines when to send information downstream via the line 10, and informs the slave modem 34 when it is permitted to send information upstream via the line 10. To facilitate these communications, the information sent via the line 10 comprises not only the data packets of Ethernet frames but also control packets downstream and response packets upstream between the master and slave modems. The data and control packets are incorporated into ECAP frames which can take various forms. Control units in the master and slave modems perform the necessary conversions between the Ethernet frames and ECAP data frames, and generate and respond to the ECAP control and response frames. Each of the master and slave modems 32 and 34 includes an Ethernet interface as described above and hence has a unique network address provided by this interface; these addresses are used to address messages (control and response packets) between the modems and can also be used for addressing the modems from other devices such as the SCM 42 as described below.

Each of the modems 32 and 34 includes a modulator, demodulator, and related functions that are conveniently implemented in known manner using one or more DSPs (digital signal processors) with analog-digital conversion in known manner. The DSPs are conveniently controlled to provide arbitrary different signal bandwidths, low frequency limits (or, equivalently, filter centre frequencies), modulation methods (for example the DSPs are programmed to select any of a plurality of modulation methods such as QAM (quadrature amplitude modulation), QPSK (quadrature phase shift keying), and BPSK (binary phase shift keying)), and (e.g. for QAM) different numbers of bits per symbol. The programming and control of DSPs in this manner is known in the art and need not be further described here. However, it is observed that this programming and control, and control of the signal levels transmitted from the modems to the line 10, provides extensive control over the power spectral density (PSD) of signals supplied to the line 10.

It can be appreciated from the above outline that the collision avoidance protocol ensures that the modems 32 and 34 operate in a half-duplex manner for communications between them via the line 10, with the total transmission capacity of the line being shared between the downstream and upstream directions of transmission. The protocol provides for control of the signal bandwidth, modulation method, etc. to provide a maximum throughput of Ethernet frames via the line 10 as described in the related application. However, the same control principles can be used in accordance with the present invention to adjust the PSD of signals supplied by the modems 32 and 34 to the line 10 to reduce NEXT as described above with reference to FIG. 1.

Furthermore, it can be appreciated that the half-duplex communications between the modems 32 and 34 also provides, or can very easily provide, periods during which signals are not supplied to the line 10 and accordingly that can be used for monitoring the line 10 as described above. For example, the control packets communicated from the master modem 32 to the slave modem conveniently provide a facility for the master modem 32 to instruct the slave modem 34 not to supply signals to the line 10 for a given period, and to monitor the line 10 as described above. During the same period, the master modem 32 similarly can suspend supply of any signals to the line 10 and can monitor the line 10, whereby each modem monitors signals on the line 10 primarily due to NEXT. Monitoring data from the slave modem 34 is then communicated in response packets to the master modem 32, so that only the master modem 32 performs a spectral analysis and the slave modem 34 can be simplified accordingly (it must still be capable of monitoring NEXT PSD, but does not need to analyse the resulting data). As described in the related application and indicated above, the master modem 32 is advantageously used in a multiplexed manner for a plurality of lines 10 and associated slave modems, and accordingly a single master modem can perform the spectral analysis, in an ongoing manner, for all of the lines 10 which it serves. In each case the master modem 32 then sets its own PSD parameters, and via control packets commands the respective slave modem 34 to set its PSD parameters, in accordance with the determined PSD on the respective line 10 to minimize PSD overlap, and hence NEXT, as described above and to achieve an optimal (for the prevailing conditions applicable to that particular line 10) throughput of data frames as discussed above.

It can be appreciated that the ECAP communications established between the master and slave modems 32 and 34 provide a very simple and convenient facility for both establishing silent periods for monitoring NEXT on the line 10 and adjusting the PSD of signals supplied by the modems to the line 10, not least because the Ethernet frames to be communicated are already buffered in buffers in the modems. This provides a distinct advantage over other arrangements using conventional modem communications, for which the establishment of silent periods for monitoring, and the control of the PSD of signals supplied to the telephone line, may be considerably more complex.

As described above, the analysis of data provided by the monitoring of NEXT by both modems 12 and 14 can be carried out by the modem 32, and this can be multiplexed for a plurality of lines 10. This multiplexing or concentration of the analysis of data to determine appropriate PSD parameters for the modems can be further extended to be carried out by the SCM 42 instead of by the modems, with messages being communicated between the SCM 42 and the modems accordingly. In this respect, the modems 32 and 34 can operate independently and can be addressed individually, using their respective Ethernet addresses, for communications between the SCM 42 and the respective modem. Alternatively, as described below in greater detail, the SCM 42 can communicate with the master modem 32 at the C.O. end of the line 10, the master modem 32 communicating with the slave modem 34 using ECAP communications as described above.

Figure 3:
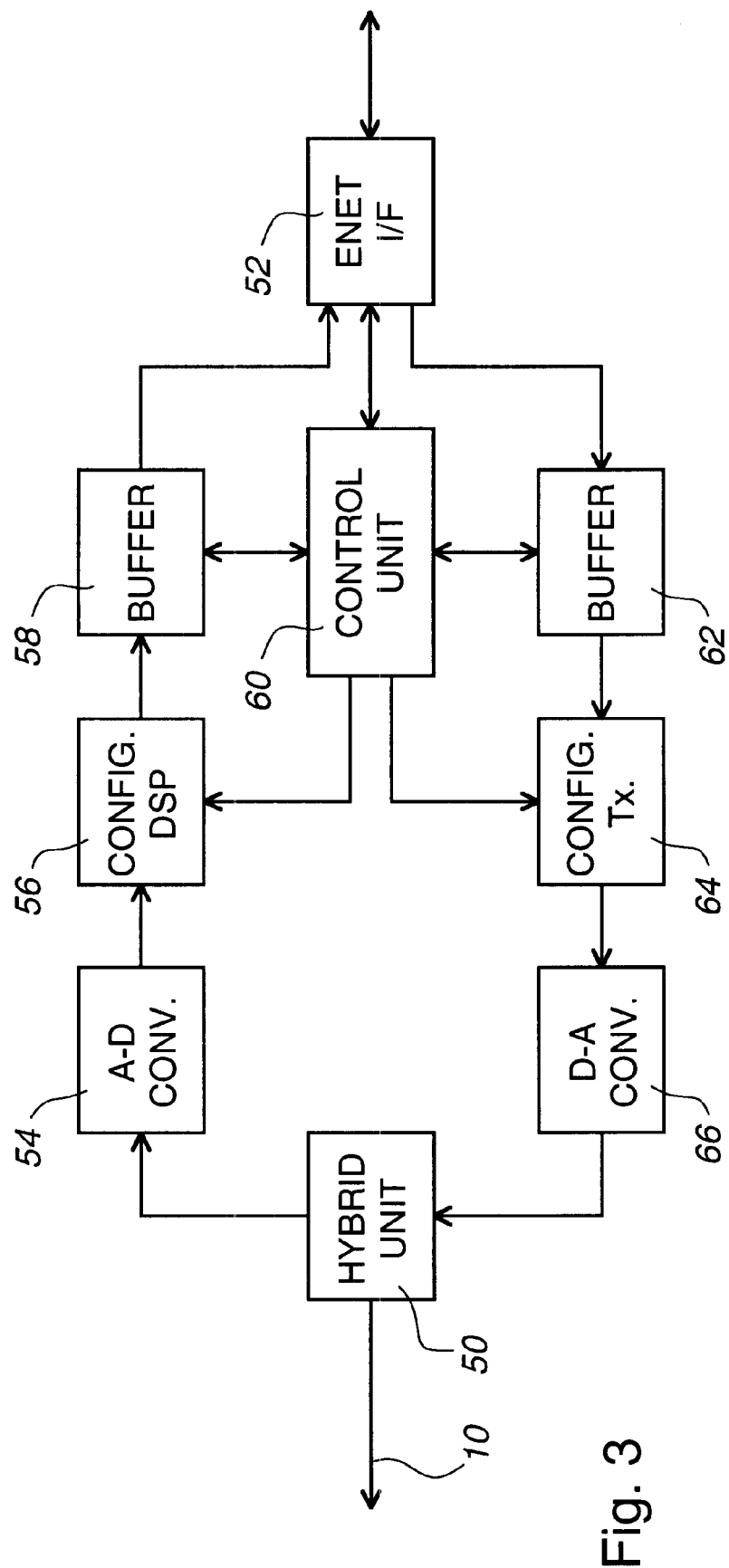
FIG. 3 illustrates parts of a modem used in the arrangement of FIG. 2.
Figure 4:
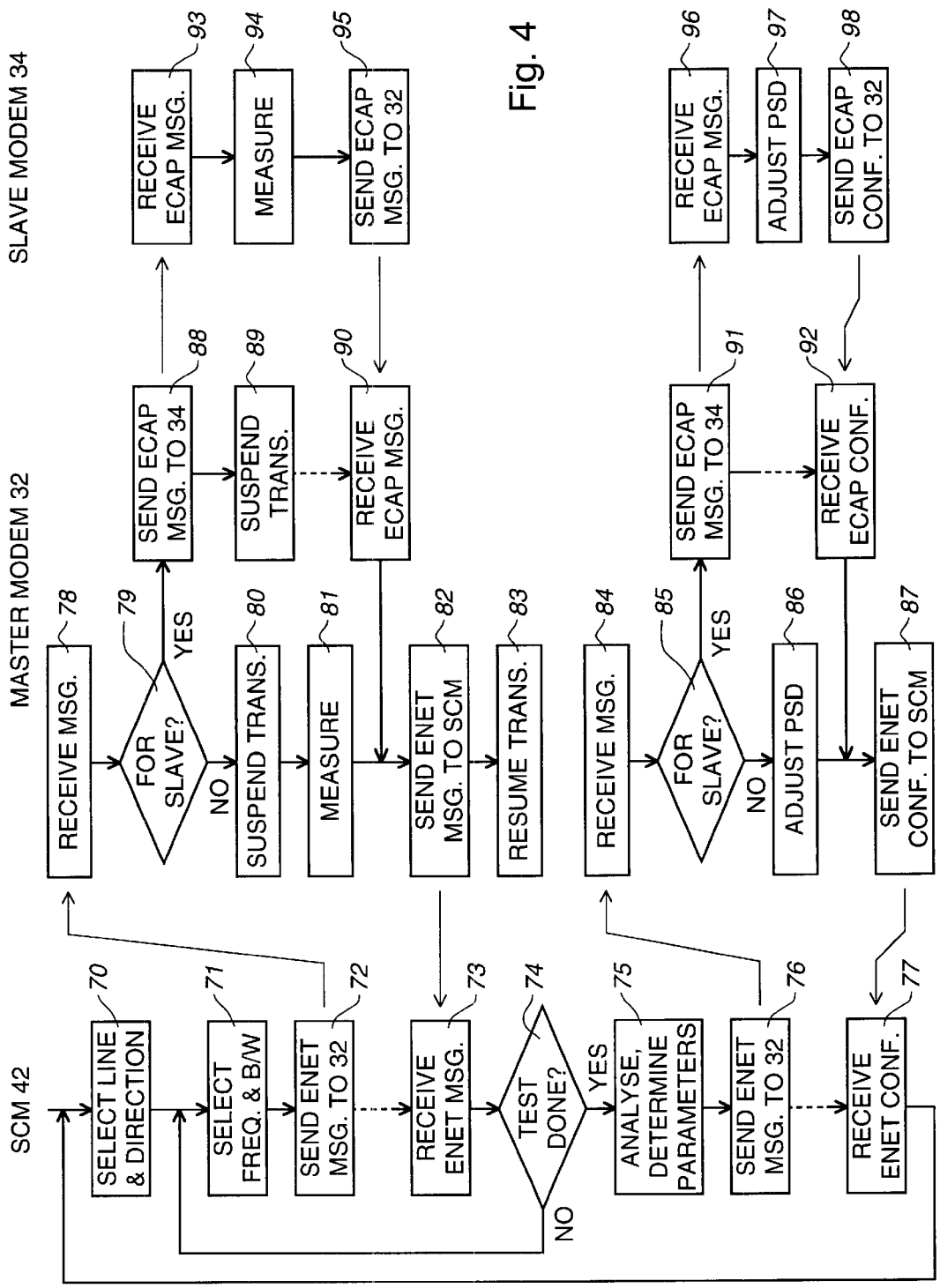
FIG. 4 illustrates a flow chart with reference to which operation of an arrangement in accordance with an embodiment of the invention is explained.

This is described further below with reference to FIG. 3, illustrating a block diagram form of the modems 32 and 34, and FIG. 4 showing a flow chart.

Referring to FIG. 3, each of the modems 32 and 34 comprises a hybrid unit 50 connected (optionally via a diplexing filter 30, not shown in FIG. 3) to the telephone line 10 and an Ethernet interface (ENET I/F) 52 for connection to the terminal device 36 or Ethernet switch 38. Analog signals received via the line 10 are supplied via the hybrid unit 50 to an analog-digital (A-D) converter 54 to be converted into digital form, the digital signals being passed via a configurable digital signal processor (DSP) 56 to a buffer 58, which exchanges control (or response) information with a control unit 60 and data to be passed on in Ethernet frames with the interface 52. In the opposite direction, a buffer 62 exchanges control or response information with the control unit 60 and Ethernet frame data with the interface 52, and information from the buffer 62 is supplied via a configurable transmitter (Tx.) 64 and a digital-analog (D-A) converter 66 to the hybrid unit 50 and thence to the line 10. Digital components of the master modem 32 can be multiplexed for a plurality of lines 10.

The control unit 60 controls the operation of the modem as either a master modem 32 or a slave modem 34. For a master modem 32, Ethernet frames are exchanged with the Network from the buffers 58 and 62 via the interface 52. The control unit 60 controls encapsulation into ECAP frames of Ethernet data frames from the buffer 62 and control information which it generates for the slave modem 34, and controls the downstream transmission of these via the transmitter 64, converter 66, hybrid unit 50, and the line 10. The control information includes polls which permit the slave modem 34 to transmit in the upstream direction, whereby the master modem ensures half duplex transmission on the line 10 without collisions between the downstream and upstream transmission directions. Upstream ECAP frames are received via the hybrid unit 50, converter 54, and DSP 56, with response information being supplied to the control unit 60 and Ethernet data frames being supplied via the buffer 58 to the Ethernet interface 52.

Conversely, for a slave modem 34 ECAP frames on the line 10 are received via the hybrid unit 50, converter 54, and DSP 56, with control information supplied to the slave modem's control unit 60 and Ethernet data frames being supplied via the buffer 58 and Ethernet interface 52 to the terminal device 36. In response to a poll in the control information received from the master modem, the control unit 60 in the slave modem controls transmission upstream of one or more frames containing response information and/or Ethernet data frames from the buffer 62 in the slave modem, as instructed by the master modem 32.

The control unit 60 in each modem also controls the configuration of the DSP 56 and transmitter 64 of the modem. In particular, for example, it controls parameters of the transmitter 64 such as the on/off state, signal level, amplitude slope (variation in signal amplitude with frequency over the pass band), centre frequency, and modulation scheme (e.g. QPSK or QAM and number of bits per symbol), which affect not only the transmission rate but also the PSD of the transmitted signal. It controls similar parameters for the DSP 56 in a receive mode of the modem used for normal operation, and in a monitoring mode used for monitoring NEXT as described above it controls the DSP centre frequency and bandwidth to provide for level measurement of any received crosstalk.

The flow chart in FIG. 4 illustrates steps associated with this monitoring, this in this case being controlled by the SCM 42 as indicated above. Each step is identified by a reference number that is given in parentheses in the following description. Steps 70 to 77 are performed by the SCM 42 and are shown at the left of FIG. 4, steps 78 to 92 are performed by the master modem 32 and are shown in the middle of FIG. 4, and steps 93 to 98 are performed by the slave modem 34 and are shown at the right of FIG. 4.

Referring to FIG. 4, the SCM 42 initially selects (70) a telephone line 10 and direction to test, i.e. whether to monitor NEXT at the master modem 32 or the slave modem 34 on the selected line, and then selects (71) a centre frequency and bandwidth for this monitoring, sending (72) via the Network a message containing this information in an Ethernet frame addressed to the master modem 32 using its address (determined by the Ethernet interface 52 of this master modem). The master modem 32 receives (78) this Ethernet frame and its control unit 60 determines (79) whether the monitoring is to be carried out by the slave modem 34. If not, then the control unit 60 of the master modem 32 suspends (80) transmission of frames downstream (thereby also suspending polling for the slave modem 34 so that frames are also not transmitted upstream on the line 10), configures the DSP 56 in accordance with the provided message from the SCM 42 to perform (81) the desired measurement or monitoring of NEXT on the line 10, sends a resulting message in a conventional Ethernet frame addressed to the SCM 42 via the Network, and resumes (83) its transmission of frames downstream (and polling of the slave modem to permit upstream transmission).

The SCM 42 receives (73) the Ethernet frame containing the monitoring information and determines (74) whether a desired test has been completed. If not, it returns to the step 71 and the above sequence is repeated for another selected centre frequency and/or bandwidth. If the test is complete, then the SCM 42 analyses (75) the monitoring data provided and determines (75) PSD parameters for signals sent to the respective line 10 by the respective modem to minimize interference with any other communications signals that it determines, in the manner described above, may be affected by crosstalk with signals from this respective modem. It then sends (76) an Ethernet frame addressed to the master modem 32 containing a message with the determined parameters. The master modem 32 receives (84) this Ethernet frame and its control unit 60 determines (85) whether the message is for the slave modem 34. If not, then the control unit 60 of the master modem 32 adjusts (86) the configuration of its transmitter 64 in accordance with the PSD parameters provided, and sends (87) an Ethernet frame to the SCM 42 with a message confirming this adjustment. This is received (77) by the SCM 42, which returns to the step 70. Obviously, these steps of the SCM 42 can be carried out contemporaneously for many lines 10.

In the event that the master modem determines (79) that a monitoring message from the SCM 42 is intended for the slave modem, then it sends (88) the message in an ECAP frame to the slave modem and then suspends (80) its transmission of frames downstream. The slave modem receives (93) this message, performs (94) the desired monitoring (without supplying signals to the line because it is not being polled to do so), and sends (95) the resulting monitoring information in an ECAP response frame to the master modem 32. The master modem receives (90) this information and sends (82) it to the SCM 42, continuing as described above.

Similarly, in the event that the master modem determines (85) that a PSD adjustment message from the SCM 42 is intended for the slave modem, then it sends (91) the message in an ECAP frame to the slave modem, which receives (96) this message, adjusts (97) the configuration of its transmitter 64 in accordance with the PSD parameters provided, and sends (98) a message confirming this adjustment in an ECAP frame to the master modem 32. This is received (92) by the master modem 32 and forwarded (87) to the SCM 42, continuing as described above.

It can be seen that in the manner described above analysis of monitoring data is performed centrally by the SCM 42 and can be performed efficiently for many lines 10. In each case monitoring is performed while signals are not supplied to the relevant line 10, the existing DSP being configured for this purpose. The relatively brief monitoring periods do not significantly interrupt the transmission of information in either direction on the line 10, because this information is already buffered in the buffer 62 in each modem. During the monitoring, Ethernet frames from the buffer 58 in each modem can still be supplied via the respective Ethernet interface 52. Furthermore, it can be appreciated that brief monitoring periods may be established during otherwise unused or idle periods of the half duplex communications on the line 10, without any extra interruption of the information transmission on the line 10, and/or that the same monitoring periods can be used for monitoring at both ends of the line 10.

Within the constraints imposed by the PSD parameters provided by the SCM 42 to reduce crosstalk, the master modem 34 can still optimize communications on the line 10 in the manner fully described in the related application, for example controlling a ratio of upstream and downstream frame transmission in dependence upon buffer fills.

Although as described above the slave modem 34 communicates with the SCM 42 via the master modem 32, communications could instead be carried out using Ethernet frames addressed directly between the SCM 42 and the slave modem 34. Such frames would, of course, still be communicated via the master modem 32.

The invention has been described above in terms of a new communications system being provided, and adjusting the PSDs of its signals, to be compatible with any existing system with which there might otherwise be excessive interference. It can be appreciated that the same advantages can apply in respect of two or more new systems each of which can adjust its PSDs so that they do not interfere with one another or with any other existing systems, so that multiple systems can coexist in a compatible manner.

Thus although particular embodiments of the invention have been described in detail, it should be appreciated that these and numerous other modifications, variations, and adaptations may be made without departing from the scope of the invention as defined in the claims.

What is claimed is:

1. A method of controlling a power spectral density (PSD) for supplying signals from a signal transmitter to a communications path during operation of a communications system including the signal transmitter, comprising the steps of:

suspending a supply of signals from the signal transmitter to the communications path;

determining a PSD on the communications path, due to other communications while the supply of signals from the signal transmitter to the communications path is suspended; and adjusting at least one parameter of the signals supplied from the signal transmitter to the communications path in dependence upon the determined PSD, to reduce overlap between the PSD of the signals supplied from the signal transmitter to the communications path and the determined PSD.

2. A method as claimed in claim 1 wherein the step of determining a PSD on the communications path comprises the steps of:

storing PSD templates for communications systems;

monitoring a PSD on the communications path, due to other communications, in the absence of signals supplied from the signal transmitter to the communications path;

comparing the monitored PSD on the communications path with the templates to identify a communications system corresponding to the monitored PSD; and producing the determined PSD in dependence upon the identified communications system.

3. A method as claimed in claim 1 wherein said at least one parameter comprises a power of the signals supplied from the signal transmitter to the communications path.

4. A method as claimed in claim 1 wherein said at least one parameter comprises a frequency band of the signals supplied from the signal transmitter to the communications path.

5. A method as claimed in claim 1 wherein said at least one parameter comprises a modulation scheme of the signals supplied from the signal transmitter to the communications path.

6. A method as claimed in claim 1 wherein said at least one parameter comprises a power, a frequency band, and a modulation scheme of the signals supplied from the signal transmitter to the communications path.

7. A method as claimed in claim 3 wherein said at least one parameter comprises a power of the signals supplied from the signal transmitter to the communications path.

8. A method as claimed in claim 3 wherein said at least one parameter comprises a frequency band of the signals supplied from the signal transmitter to the communications path.

9. A method as claimed in claim 3 wherein said at least one parameter comprises a modulation scheme of the signals supplied from the signal transmitter to the communications path.

10. A method as claimed in claim 3 wherein said at least one parameter comprises a power, a frequency band, and a modulation scheme of the signals supplied from the signal transmitter to the communications path.

11. A method as claimed in claim 1 wherein said at least one parameter comprises a power of the signals supplied from the signal transmitter to the communications path.

12. A method as claimed in claim 1 wherein said at least one parameter comprises a frequency band of the signals supplied from the signal transmitter to the communications path.

13. A method as claimed in claim 1 wherein said at least one parameter comprises a modulation scheme of the signals supplied from the signal transmitter to the communications path.

14. A method as claimed in claim 1 wherein said at least one parameter comprises a power, a frequency band, and a modulation scheme of the signals supplied from the signal transmitter to the communications path.

15. A method of controlling a power spectral density (PSD) for supplying signals from a signal transmitter to a communications path during operation of a communications system including the signal transmitter, comprising the steps of:

monitoring a PSD of signals on the communications path;

determining, in dependence upon said monitoring, a PSD on the communications path due to crosstalk from other communications;

supplying signals from the signal transmitter to the communications path; and adjusting at least one parameter of the signals supplied from the signal transmitter to the communications path in dependence upon the determined PSD to reduce overlap between the PSD of the signals supplied from the signal transmitter to the communications path and the determined PSD.

16. A method as claimed in claim 15 wherein said at least one parameter comprises a power of the signals supplied from the signal transmitter to the communications path.

17. A method as claimed in claim 15 wherein said at least one parameter comprises a frequency band of the signals supplied from the signal transmitter to the communications path.

18. A method as claimed in claim 15 wherein said at least one parameter comprises a modulation scheme of the signals supplied from the signal transmitter to the communications path.

19. A method as claimed in claim 15 wherein said at least one parameter comprises a power, a frequency band, and a modulation scheme of the signals supplied from the signal transmitter to the communications path.

20. A method as claimed in claim 15 wherein the step of determining a PSD on the communications path comprises the steps of:

storing PSD templates for communications systems;

monitoring a PSD on the communications path, due to other communications, in the absence of signals supplied from the signal transmitter to the communications path;

comparing the monitored PSD on the communications path with the templates to identify a communications system corresponding to the monitored PSD; and producing the determined PSD in dependence upon the identified communications system.

* * * * *